3,531,530
PROCESS FOR THE MANUFACTURE OF A
MIXTURE OF FORMYLCYCLODODECANE
AND CYCLODODECENE
Hans Dalla Torre, Domat-Ems, Grisons, and Peter
Jaeger, Chur, Grisons, Switzerland, assignors to Inventa
A.G. für Forschung und Patentverwertung, Zurich,
Switzerland
No Drawing. Filed Aug. 17, 1967, Ser. No. 661,187
Claims priority, application Switzerland, Aug. 17, 1966,
11,904/66
Int. Cl. C07c 45/08
U.S. Cl. 260—598                                8 Claims

ABSTRACT OF THE DISCLOSURE

A process for the manufacture of a mixture of formylcyclododecane and cyclododecene by reacting 1,5,9-cyclododecatriene with carbon monoxide and hydrogen in the presence of less than 1% cobalt, preferably in the presence of a solvent, and in given molar proportions of cyclododecatriene to hydrogen and of hydrogen to carbon monoxide. The resulting product is a starting material in the production of nylon-12.

---

The invention relates to a process for the manufacture of a mixture of formylcyclododecane and cyclododecene by hydroformylation of 1,5,9-cyclododecatriene. It is known that 1,5,9-cyclododecatriene (cis, trans, trans) can be produced aside from small quantities of the corresponding trans, trans, trans-compound (approximately 2%) by cyclization of 1,4-butadiene (G. Wilke, Z. Angew. Chem. 77 (1965), 318–323; 75 (1963), 10–19; 69 (1957, 397); and that this product reacts to a mixture of hydroformylated materials with CO and $H_2$ at elevated temperatures in the presence of catalysts, particularly cobalt-, rhodium- and ruthenium salts. The active catalysts thereby are the carbonylhydrides, formed as intermediaries.

The reaction product of the hydroformylation usually consists of mixtures of hydrocarbons which are hydrogenated to a different extent, such as cyclododecadiene, cyclododecene, cyclododecane, also of mono-, di- and trialdehydes and -carbinols, whereby the mono- and di-compounds are more or less unsaturated; furthermore of cyclododecanone, cyclododecanol, dicyclododecylmethylether and carboxylic acid ester.

Processes of this kind have been disclosed in German Pat. 1,059,904; U.S. 3,089,904; and French Pat. 1,411,-448.

Of the monoaldehydes, formylcyclododecane can readily be oxidized to cyclododecamonocarboxylic acid. The latter is a valuable starting material for nylon-12.

According to the processes hitherto known, the saturated monoaldehyde could only be obtained in the company of considerable quantities of by-products which are unsuited, e.g., for oxidation on air, or else of highly unsaturated products. The latter necessitate an additional hydrogenation to saturated aldehyde or to oxymethylcyclododecane.

It now has suprisingly been found that 1,5,9-cyclododecatriene (cis, trans, trans) furnishes the saturated monoaldehyde, i.e., formylcyclododecane, selectively and in good yield, when the molar proportions of cyclododecatriene to hydrogen are 1:3 and those of hydrogen to carbon to carbon monoxide are 2.5 to 4.5:1; furthermore by controlling the reaction time and the pressure drop so that the hydroformylation is carried out only partially.

In the process according to the invention, a cobalt catalyst is to be used in a concentration of less than 1 weight percent cobalt, calculated on the cyclododecatriene, preferably 0.03–0.8 weight percent. The total pressure must be between 100 and 300 atmospheres, preferably 100–200 atmospheres; and a reaction temperature of 130–200° C., and preferably 135–165° C., is to be employed. The time of reaction must not be more than 12 hours, and advantageously is less than 6.5 hours. The pressure drop must not be greater than theoretically calculated, figured on the reaction equation triene→formylcyclododecane.

Another unexpected advantage of the process according to the invention is found in the fact that the unhydroformylated cyclododecatriene is hydrogenated primarily to cyclododecene. Upon continuous aldehyde production, a well defined mixture of cyclododecatriene and cyclododecene thus is present as starting material. The molar proportions of cyclododecatriene to hydrogen and $H_2$:CO then must accordingly be adjusted to correspond to the weight proportions of these starting materials.

It hence is the object of the invention to provide a process for the manufacture of a mixture of formylcyclododecane and cyclododecene by reacting 1,5,9-cyclododecatriene (cis, trans, trans) with CO and $H_2$ in the presence of less than 1 weight percent of cobalt in the form of a cobalt salt as customarily used in oxo-syntheses; at a reaction time of no more than 12 hours; at substantially 130–200° C. and at substantially 100–300 atmospheres; at molar proportions of cyclododecatriene to hydrogen of 1:3 and of $H_2$:CO of 2.5 to 4.5:1; the reaction preferably being carried out in the presence of a solvent.

Preferred suitable solvents are linear aliphatic, cycloaliphatic and aromatic hydrocarbons, e.g., benzene, cyclohexane, petroleum ether, n-hexane, n-pentane, n-heptane, cyclodecene. The solvents are employed in quantities ranging from equal weight to 4 times the weight of the cyclododecatriene.

The invention now will be more fully explained by the following examples. However it should be understood that these are given merely by way of illustration, and not of limitation, and that it is intended to cover all modifications and variations which do not constitute departures from the spirit and the scope of the invention as hereinafter claimed.

The temperatures named are in degrees centigrade; percentages are by weight. The starting product, identified as "cyclododecatriene," in each instance is 1,5,9-cyclododecatriene (cis, trans, trans). Example 7 referring to the catalyst, and Example 8 referring to the temperature, are inserted merely for comparative purposes.

, EXAMPLE 1

41.5 g. cyclododecatriene, 100 ml. benzene and 0.15 g. anhydrous cobalt (II) acetate were introduced in a stainless steel autoclave of 0.5 liter capacity and provided with an agitator. The autoclave then was closed and rinsed with $H_2$. 30 atmospheres CO and 90 atmospheres $H_2$ were pressed in, and the vessel heated to 150°.

80 minutes after the start of the heating, the pressure had dropped 45 atmospheres, and the process was stopped. After allowing to cool to room temperature, the pressure was released, and the mixture rinsed with $H_2$. The product obtained was taken out of the autoclave, filtered to remove the catalyst and distilled to free it from benzene, followed by a vacuum disillation of the residue.

The gas chromatographic analysis of the distillate was carried out in a Makrogolay column with Apiezon "L" (Varian Aerograph; mixture of hydrocarbons of high carbon-number) as stationary phase and was temperature-programmed.

The following values were obtained, the figures denoting weight percent calculated on unreacted cyclodecatriene:

| | |
|---|---|
| Cyclododecane | 1.1 |
| Cyclododecene | 56.2 |
| Cyclododecadiene | — |
| Cyclododecatriene | 1.1 |
| Cyclododecanone | 1.8 |
| Cyclododecanol | 0.2 |
| Formylcyclododecane | 25.5 |
| Formylcyclododecene | — |
| Formylcyclododecadiene | 0.4 |
| Oxymethylcyclododecane | 1.7 |
| Unidentified product | 0.4 |
| High-boilers (residue) | 4.4 |

EXAMPLE 2

This example shows that the cyclododecene and oxymethylcyclododecane content increases with the time of reaction.

648 g. of cyclododecatriene, 1,600 ml. benzene and 1.6 g. cobalt (II) acetate were filled into a 5-liter autoclave with agitator, the autoclave closed and rinsed with $H_2$. 40 atmospheres CO and 120 atmospheres $H_2$ were pressed in, and the vessel heated to 150° C.

After 6 hours and 40 minutes, the pressure had decreased by 130 atmospheres. The reaction product was treated as described in Example 1.

The gas chromatographic analysis, carried out as described, gave the following results:

| | |
|---|---|
| Cyclododecatriene | 0.16 |
| Cyclododecene | 35.0 |
| Cyclododecane | 3.02 |
| Unidentified hydrocarbons | 0.08 |
| Cyclododecanone | 0.62 |
| Unsaturated cyclo-$C_{12}$-ketone | 0.58 |
| Cyclododecanol | 0.3 |
| Formylcyclododecane | 30.1 |
| Formylcyclododecadiene | 1.1 |
| Oxymethylcyclododecane | 11.2 |
| Unidentified ester | 2.3 |
| Cyclododecylmethylacetate | 0.9 |
| Unidentified product | 2.7 |
| High-boilers (residue) | 5.8 |

EXAMPLE 3

This example shows that a substantial portion of the monoaldehyde remains unsaturated with insufficient pressure drop.

81 g. of cyclododecatriene, 200 ml. benzene, 0.3 g. cobalt (II) acetate, 30 atmospheres CO and 90 atmospheres $H_2$, were charged into the autoclave. The temperature was 150°; the pressure, after 5.25 hours, dropped by 50 atmospheres. The process was concluded as in Example 1, and the analysis, carried out in the same manner, gave the following results:

| | |
|---|---|
| Cyclododecatriene | 0.19 |
| Cyclododecene | 27.2 |
| Cyclododecane | 4.3 |
| Unidentified hydrocarbons | 0.3 |
| Cyclododecanone | 0.8 |
| Unsaturated cyclo-$C_{12}$-ketone | 0.4 |
| Cyclododecanol | 0.4 |
| Formylcyclododecane | 36.6 |
| Formylcyclododecene | 1.9 |
| Formylcyclododecadiene | 3.7 |
| Unidentified substance | 2.6 |
| Cyclododecylmethylacetate | 0.9 |
| Oxymethylcyclododecane | 5.6 |
| Unidentified substance | 2.2 |
| High-boilers (residue) | 4.7 |

EXAMPLE 4

The starting material was a mixture of cyclododecatriene with cyclododecene.

41.5 g. of cyclododecatriene, 40.5 g. of cyclododecene, 240 ml. benzene, 0.3 g. cobalt (II) acetate, 40 atmospheres CO and 80 atmospheres $H_2$ were charged into the autoclave. The reaction temperature was 150° C. The pressure drop after 5 hours was 35 atmospheres. After working off the product as described in Example 1, the gas chromatographic analysis, carried out at described, was as follows:

| | |
|---|---|
| Cyclododecatriene | — |
| Cyclododecane | 1.76 |
| Cyclododecene | 52.4 |
| Cyclododecanone | 1.8 |
| Unsaturated cyclo-$C_{12}$-ketone | 0.6 |
| Formylcyclododecane | 30.0 |
| Formylcyclododecadiene | 0.1 |
| Formylcyclododecene | 0.4 |
| Oxymethylcyclododecane | 0.51 |
| High-boilers (residue) | 6.7 |

EXAMPLE 5

Cyclohexane as solvent.

Charge of the autoclave: 81 g. cyclododecatriene, 200 ml. cyclohexane, 0.3 g. cobalt (II) acetate, 40 atmospheres CO, 120 atmospheres $H_2$. Reaction temperature: 150°. Pressure drop after 70 minutes: 60 atmospheres. Analysis results:

| | |
|---|---|
| Cyclododecatriene | 0.48 |
| Cyclododecene | 31.8 |
| Cyclododecane | 4.3 |
| Cyclododecanone | 0.8 |
| Unsaturated cyclo-$C_{12}$-ketone | 0.4 |
| Cyclododecanol | 0.8 |
| Formylcyclododecane | 33.5 |
| Formylcyclododecadiene | 1.63 |
| Formylcyclododecene | 0.8 |
| Cyclododecanecarboxylic acid methylester | 0.27 |
| Unidentified product | 1.3 |
| Oxymethylcyclododecane | 6.3 |
| Unidentified ester | 1.5 |
| Unidentified product | 1.9 |
| High-boilers (residue) | 8.5 |

EXAMPLE 6

N-Pentane as solvent.

Charge: 81 g. cyclododecatriene, 200 ml. n-pentane, 0.3 g. cobalt (II) acetate, 40 atmospheres CO, 120 atmospheres $H_2$. Reaction temperature: 150°. Pressure drop after 4 hours 10 minutes: 55 atmospheres.

The product, after treatment and analysis, as described in Example 1, had the following composition:

| | |
|---|---|
| Cyclododecatriene | 0.96 |
| Cyclododecene | 37.1 |
| Cyclododecane | 4.3 |
| Unidentified hydrocarbons | 0.47 |
| Cyclododecanone | 0.9 |
| Unsaturated cyclic-$C_{12}$-ketone | 1.1 |
| Cyclododecanol | 1.1 |
| Formylcyclododecane | 26.6 |
| Formylcyclododecadiene | 3.8 |
| Formylcyclododecene | 1.3 |
| Unidentified product | 1.2 |
| Oxymethylcyclododecane | 5.1 |
| Ester | 1.3 |
| Cyclododecylmethylacetate | 0.1 |
| Unidentified product | 2.7 |
| High-boilers (residue) | 8.6 |

EXAMPLE 7

The example shows the adverse influence of increased amounts of catalyst on the course of the hydroformylation, leading to less monoaldehyde.

Charge of a 1-liter autoclave: 81 g. cyclododecatriene, 200 ml. benzene, 2.5 g. cobalt (II) acetate (1% cobalt, calculated on cyclododecatriene), 40 atmospheres CO, 120 atmospheres $H_2$. Reaction temperature 150°.

Results of the analysis after rectification, both as described in Example 1:

| | |
|---|---|
| Cyclododecatriene | — |
| Cyclododecene | 2.5 |
| Cyclododecane | 6.24 |
| Cyclododecanone | 0.9 |
| Cyclododecanol | 0.26 |
| Formylcyclododecane | 6.95 |
| Oxymethylcyclododecane | 52.8 |
| Unidentified product | 5.4 |
| Cyclododecylmethylacetate | 0.74 |
| High-boilers (residue) | 18.8 |

EXAMPLE 8

Influence of the temperature on the course of the hydroformylation.

Charge: 40.5 g. cyclododecatriene, 41.5 g. cyclododecene, 240 ml. benzene, 0.3 g. cobalt (II) acetate, 40 atmospheres CO, 80 atmospheres $H_2$. Reaction temperature 170°. The reaction was terminated after 50 minutes, the pressure drop at that time was 40 atmospheres. After distillation, the gaschromatographic analysis showed the following result:

| | |
|---|---|
| Cyclododecatriene | — |
| Cyclododecene | 20.6 |
| Cyclododecane | 5.3 |
| Unidentified hydrocarbon | 0.27 |
| Cyclododecanone | 1.01 |
| Unsaturated cyclo-$C_{12}$-ketone | 0.5 |
| Unidentified product | 0.18 |
| Cyclododecanol | 1.25 |
| Formylcyclododecane | 0.48 |
| Formylcyclododecadiene | 15.3 |
| Oxymethylcyclododecane | 26.5 |
| Cyclododecanecarboxylic acid methyl ester | 7.3 |
| Unidentified ester | 2.19 |
| High-boilers (residue) | 10.2 |

We claim as our invention:

1. A process for the manufacture of a mixture of formylcyclododecane and cyclododecene in a percentage of the components ranging from 20 to 50 and 25 to 70 respectively based on the reacted cyclododecatriene which comprises reacting 1,5,9-cyclododecatriene, hydrogen and carbon monoxide, in the presence of a catalyst containing less than 1% by weight cobalt based upon the weight of the triene, at an initial pressure of 100 to 300 atmospheres and at a temperature of 130 to 200° C. for a reaction time of not more than 12 hours using an excess of hydrogen and carbon monoxide with respect to the triene the consumption of the triene and hydrogen being in the molar ratio of substantially 1:3 and the molar ratio of the hydrogen to carbon monoxide being substantially from 2.5:1 to 4.5:1, there being a pressure drop occurring during hydroformylation, said drop being less than calculated for the reaction equation triene→formylcyclododecane.

2. A process as defined in claim 1 wherein said reaction is carried out in a solvent and under agitation.

3. A process as defined in claim 1 wherein said reaction time is 1 to 6 hours.

4. The process as defined in claim 1, wherein said time is no more than 6.5 hours.

5. The process as defined in claim 1, wherein said catalyst contains 0.03–0.8 weight percent of cobalt.

6. The process as defined in claim 1, wherein said reaction is carried out in the presence of 1 to 4 times the weight of said cyclododecatriene of a solvent selected from the group consisting of linear aliphatic, cycloaliphatic and aromatic hydrocarbons.

7. The process as defined in claim 6, wherein said solvents are selected from the group consisting of n-pentane, n-hexane, n-heptane, cyclohexane, cyclododecene, or benzene.

8. The process as defined in claim 1, wherein a mixture of cyclododecatriene and cyclododecene is coreacted with said hydrogen and said carbon monoxide.

References Cited

UNITED STATES PATENTS

| | | | |
|---|---|---|---|
| 2,912,464 | 11/1959 | Hess et al. | 260—598 XR |
| 3,089,904 | 5/1963 | Lippincott et al. | 260—598 XR |
| 3,184,432 | 5/1965 | Wilke et al. | 260—598 XR |
| 3,342,878 | 9/1967 | Berther et al. | 260—598 XR |

BERNARD HELFIN, Primary Examiner

U.S. Cl. X.R.

260—514, 666